Figure 1:
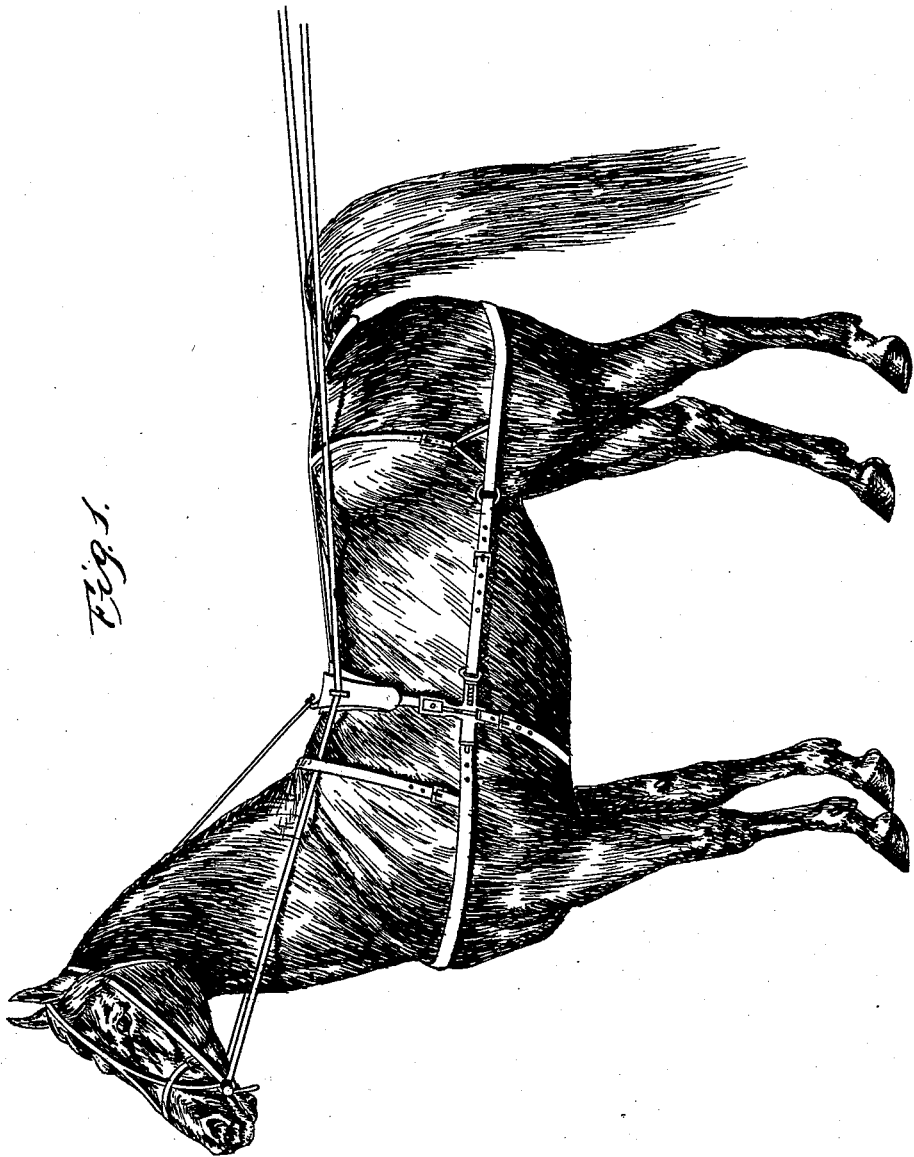

(No Model.) 2 Sheets—Sheet 1.
F. M., W. H. & C. T. BECK.
HARNESS.

No. 540,849. Patented June 11, 1895.

(No Model.) 2 Sheets—Sheet 2.
F. M., W. H. & C. T. BECK.
HARNESS.
No. 540,849. Patented June 11, 1895.
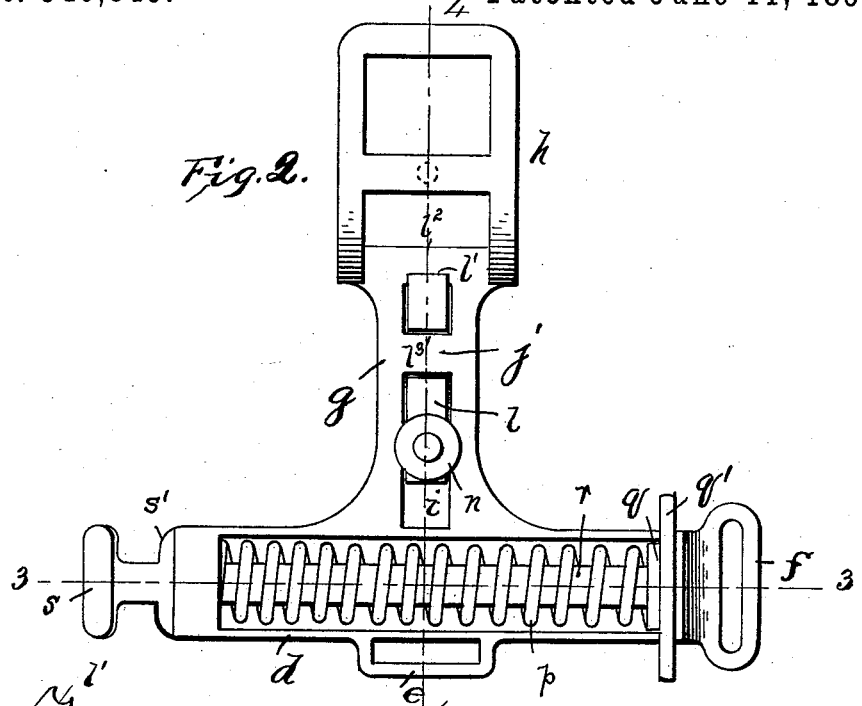
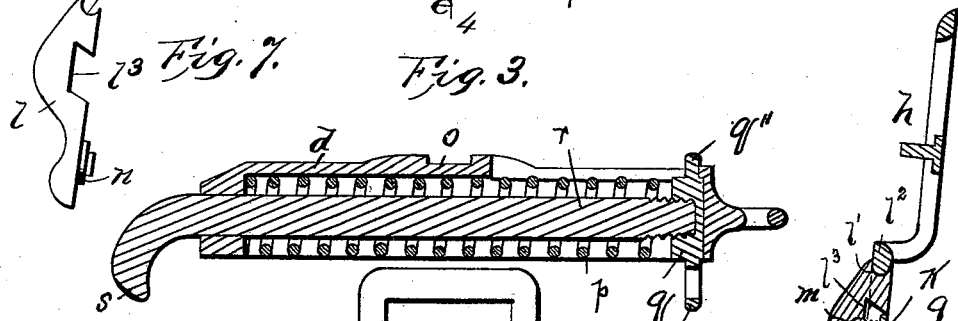
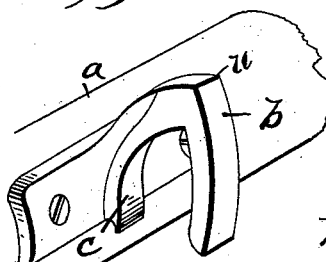
Witnesses
E. C. Duffy
Chas. W. Werber
Inventors
F. M. Beck
W. H. Beck & C. T. Beck
O. E. Duffy
Attorney

UNITED STATES PATENT OFFICE.

FRANCIS M. BECK, WILLIAM H. BECK, AND CHARLES T. BECK, OF WABASH, INDIANA.

HARNESS.

SPECIFICATION forming part of Letters Patent No. 540,849, dated June 11, 1895.

Application filed January 24, 1895. Serial No. 536,133. (No model.)

*To all whom it may concern:*

Be it known that we, FRANCIS M. BECK, WILLIAM H. BECK, and CHARLES T. BECK, of Wabash, in the county of Wabash and State of Indiana, have invented certain new and useful Improvements in Harness and Hitching Attachments; and we do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in harness and more particularly to means for attaching draft animals to vehicle shafts.

The object of the invention is to provide improved means and arrangements for connecting draft animals to vehicle shafts whereby the harness can be easily and quickly attached to and detached from the shafts by the employment of exceedingly simple, durable and economical means composed of a minimum number of parts and whereby the traces can be shortened and the single tree dispensed with.

The invention consists in certain novel features of construction and in combinations of parts more fully and particularly pointed out hereinafter, and described in the claims.

Referring to the accompanying drawings, Figure 1 is a side view of a portion of a horse provided with the improved device for coupling parts of the harness and attaching it to the vehicle-shafts. Fig. 2 is an inside elevation of one of the coupling-pieces. Fig. 3 is a section on the line 3 3, Fig. 2, showing the on draft-equalizing spring. Fig. 4 is a section the line 4 4, Fig. 2, showing in addition one of the hooks attached to the vehicle-shafts. Fig. 5 is a detail perspective view showing one of the hooks attached to one of the shafts. Fig. 6 is an elevation of the coupling-plate formed for employment without the draft-equalizing spring. Fig. 7 is a detail side elevation of the latch.

In the drawings $a, a$, are the shafts of the vehicle provided at suitable points on their inner sides with the hooks $b, b$. Each hook is preferably cast integral with the base formed to fit the inner face of the shafts and be rigidly secured thereto and with a hook extending upwardly with its point extending downwardly a distance from the face of said base, and the face of the base opposite said depending free end of the hook is provided with a rib $c$, usually parallel with said free end of the hook. These hooks are preferably attached to the shafts at or about the place usually occupied by the ordinary shaft bearers or tugs and extend inwardly transversely to the line of draft.

$d$, is the body of the coupling device provided on its lower longitudinal side with a metal loop $e$, preferably cast integral with the body of the coupling, to receive the billet buckled to the belly-band. At its rear end the body of the coupling piece is provided with the loop or opening $f$, to receive the hold-back strap. The arm or extension $g$, extends up from the central portion of the body of the coupling and at its upper end is provided with the buckle $h$, preferably cast integral with the body and said arm, and formed to receive the gig-saddle billet. $i$, is a longitudinal slot in said arm between the buckle $h$, and the body of the coupling. Near its upper end this slot is provided with the bridge $j$, having the pin $k$.

$l$, is a spring lock or latch longitudinally arranged in said slot and notched at its upper end $l'$ to straddle, and swing on, the upper wall $l^2$ of the slot; and with a recess $l^3$ to pass over said bridge and to receive expansive coiled spring $m$, on the pin $k$, and compressed between the bridge and the top of the recess, so as to constantly tend to throw the lower end of the catch or lock outwardly. The outward swing of the lower end of the lock is limited by the stop $n$, engaging the inner face of the arm $g$, and its inward swing is limited by the top of said recess engaging the bridge. The outer face of the body of the coupling is recessed or grooved at $o$, in continuation of the said slot in the upper extension to receive the rib $c$, and part of the hook $b$.

The body of the coupling is preferably hollow and open on the inside to receive the expansive coiled draft equalizing spring $p$, longitudinally fitted therein. The rear end of this spring bears against a movable nut $q$, in said body and provided with a loop $q'$, on its outer side at the exterior inner surface of the coupling body, and with a head $q''$, at the outer surface of the coupling body to the nut, so as to guide the nut and hold it in the coupling body.

$r$, is a draft bar passing through an opening in the front end of the body of the coupling, and longitudinally through said equalizing spring, and with its inner end threaded and screwed into said nut. The outer end of the draft bar at the front of the coupling body is bent inwardly and provided with a double head $s$, and a lateral projection or shoulders $s'$, to fit opposite sides of the short trace extending rearwardly from the breast strap. The trace as oblong holes through which head $s$ is slipped edgewise in attaching or removing the trace. The free end of the trace is passed through the said loop carried by the sliding nut in the coupling body. It will thus be seen that a yielding connection is established between the draft bars sliding in the coupling bodies and the coupling bodies, by reason of the interposed coiled springs receiving direct pull of the draft bars whereby the springs are compressed between the sliding nuts and the front ends of the coupling bodies.

After the harness has been secured and adjusted on the horse by means of the coupling devices of this invention, the horse is merely driven between the shafts, and the coupling plates passed up into the hooks of the shafts, by passing their free ends into the slots and compressing the spring catches out of the way until the square shoulders $u$, at the upper ends of the hooks pass through the slot permitting the catches to spring outwardly to their normal positions with their lower ends bearing down on the upper ends or shoulders $u$, of the hooks, so that the hooks are most firmly held against disengagement from the coupling bodies until said spring catches are passed inwardly to free their lower ends from the upward square ends of the hooks.

It will be observed that the ribs of the hooks fit in the grooves in the coupling bodies as before described so that all the draft is transmitted to the shafts through said coupling bodies and hooks thereby obviating the necessity of employing single trees and so that short traces only are needed to extend from the breast strap to the coupling body. The ribs $c$, in the grooves in the coupling bodies, and the hooks passing through the slots form a most strong and rigid connection between said bodies and the shafts.

It is not necessary to employ a draft equalizing spring as the traces can be directly attached to the coupling body as shown in Fig. 6, wherein the front end of the body is provided with the headed projection $S''$, curved inwardly to buckle into the slots in the brace, while the rear end of the body has the loop to receive the free end of the trace. In this construction the entire coupling can be cast integral except the hook and spring latch. Where the draft spring is employed the coupling can be cast integral excepting the latch, draft spring, bar and sliding nut.

It should be understood that a pair of these coupling devices, rights and lefts, is required for each animal and pair of shafts.

By means of this invention horses can be most easily and quickly attached to or detached from the shafts.

The device can be produced at a minimum cost and is exceedingly simple and durable in construction.

It is evident that various changes might be made in the forms, constructions and arrangements of the parts described without departing from the spirit and scope of our invention. Hence we do not wish to limit ourselves to the exact construction herein set forth, but consider ourselves entitled to all such changes as fall within the spirit and scope of our invention.

Having thus fully described our invention, what we claim as new, and desire to secure by Letters Patent of the United States, is—

1. A coupling body for harness having a transverse seat in its outer side and a slot at the upper end of the seat, and the spring latch yieldingly extending into said slot, in combination with the shaft hook formed to pass through said opening and partially embrace the body and be held in position by said latch and having the rib to enter said seat, substantially as described.

2. A harness coupling body having the upwardly extended longitudinally slotted arm, a bridge across the slot, a latch in said slot having its upper forked end turning on the top wall of the slot, a spring between said bridge and the latch, and a stop to limit the outward swing of the latch, in combination with a rigid hooked projection from the shaft, co-operating and combined as described.

3. The hollow harness coupling body open on the inner side, the reciprocatory draft bar passing through the front end of the body with the trace fastening means at its front end, the sliding block in said body on the inner end of said bar and guided by the slot and headed projection, the trace loop at the inner side of the block, and the spring between the block and front end of the body, substantially as described.

In testimony that we claim the foregoing as our own we hereto affix our signatures in presence of two witnesses.

FRANCIS M. BECK.
    WILLIAM H. BECK.
    CHARLES T. BECK.

Witnesses:
 CHARLES FLINN,
 EDWARD L. LEPPER.